Sept. 4, 1923.

F. T. RAUBERT

GRAPEFRUIT KNIFE

Filed May 31, 1922

1,466,753

Inventor

Frank T. Raubert

By George J. Oltsch

Attorney

Patented Sept. 4, 1923.

1,466,753

UNITED STATES PATENT OFFICE.

FRANK T. RAUBERT, OF LIGONIER, INDIANA, ASSIGNOR TO MANDEL ALTFELD, OF SOUTH BEND, INDIANA.

GRAPEFRUIT KNIFE.

Application filed May 31, 1922. Serial No. 564,903.

*To all whom it may concern:*

Be it known that I, FRANK T. RAUBERT, a citizen of the United States, residing at Ligonier, in the county of Noble and State of Indiana, have invented certain new and useful Improvements in Grapefruit Knives, of which the following is a specification.

The invention relates to grapefruit knives and has for its object to provide a device of this character having a hooked end in the same plane as the main body of the blade and provided with a double cutting edge. The hooked end forms means whereby the core may be severed from the skin, thereby allowing the entire meat of the grapefruit to be removed from the skin.

A further object is to form the blade from flexible material and with a cutting edge thereby allowing the operator during a grapefruit cutting operation to flex the blade to conform to the inner wall of the skin and to separate the meat from the skin by rotation of the knife.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1:
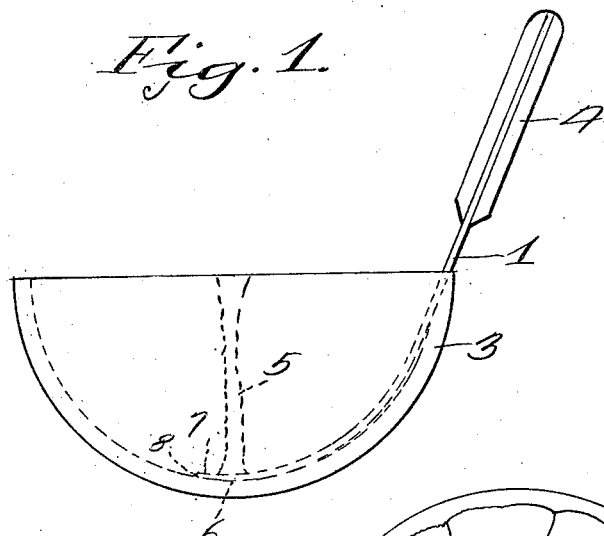
Figure 1 is a side elevation of a portion of a grapefruit, showing the knife in position for use.
Figure 2:
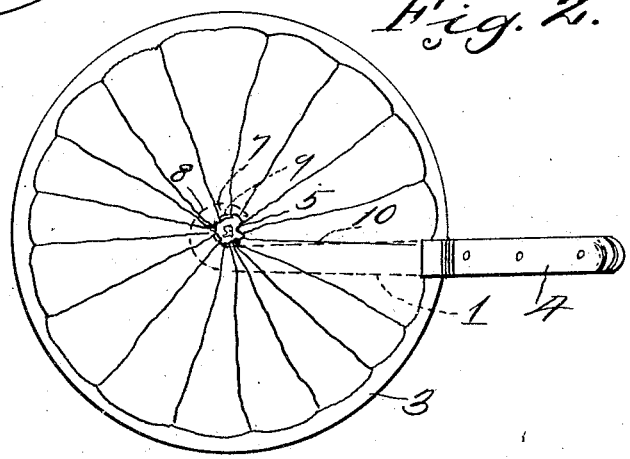
Figure 2 is a top plan view of a piece of grapefruit showing the knife in position for severing the core.
Figure 3:
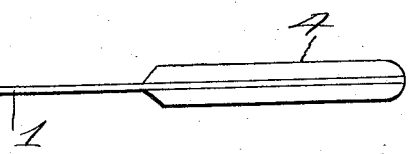
Figure 3 is a side elevation of the knife.
Figure 4:
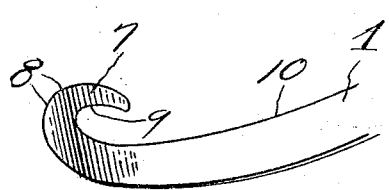
Figure 4 is a perspective view of the hooked end of the knife.

Referring to the drawing, the numeral 1 designates the blade of the knife, which is preferably formed from spring material whereby the blade will flex as shown in Figure 1 to conform with the curvature of the inner side of the skin 3 of the grapefruit. The blade 1 is provided with a handle 4 adapted to be grasped by the operator during a severing operation. It has been found extremely difficult to sever the core 5 of the grapefruit at the point 6 where it joins the inner wall of the skin 3. To overcome this difficulty the blade 1 is provided with a relatively large hooked member 7 which is in the same plane as the blade 1 and has its opposite edges 8 and 9 sharpened. The knife is forced downwardly until the hook 7 is adjacent one side of the core 5, at which time the hook is moved into the position shown in Figure 2, and the knife as a whole rotated around the section of grapefruit in such a manner that its cutting edge 10 will sever the meat from the skin, and after a complete rotation the core may be severed at the point 6 by imparting a pull on the knife. It will be noted that the hook 7 not only forms means whereby the core 5 may be severed, but also forms a pivotal point for the end of the knife blade, thereby insuring accurate guiding of the knife blade during a severing operation. By forming the hook 7 in the same plane as the blade 1 it will be seen that its cutting edges 8 and 9 will also be in the same plane as the cutting edge 10 and consequently the hook will not interfere with the severing operation of the cutting edge 10.

From the above it will be seen that a grapefruit knife is provided which is simple in construction, the parts reduced to a minimum, and the knife blade provided with a hooked end so constructed that it may be used as a pivot for the knife and also as severing means whereby the core of the grapefruit may be severed.

The invention having been set forth what is claimed as new and useful is:—

1. The combination with a flexible blade of a grapefruit knife having a curved end portion, of a relatively large hooked end carried by said blade, said hooked end having its edges disposed in the same plane as the edge of the curved end of the knife blade.

2. The combination with a flexible grapefruit knife blade having a curved end portion, of a relatively large hooked end carried by said blade, said hooked end being provided with cutting edges, and its edges being disposed in the same plane as the edge of the curved portion of the knife blade.

3. The combination with a grape fruit knife blade having a curved end portion, of a relatively large hooked end carried by said blade, said hooked end being disposed to the side of the flat side of said blade adjacent the cutting edge thereof, the opposite edges of said hooked end being sharpened, and the edges of the hooked end being disposed in the same plane as the edge of the knife blade.

In testimony whereof I affix my signature.

FRANK T. RAUBERT.